United States Patent [19]
Nozi

[11] 3,873,787
[45] Mar. 25, 1975

[54] AIR-PRESSURE SWITCH DEVICE FOR PNEUMATIC TIRES

[75] Inventor: Akio Nozi, Tokyo, Japan

[73] Assignee: Honda Giken Kogyo Kabushiki Kaisha, Tokyo, Japan

[22] Filed: Dec. 26, 1973

[21] Appl. No.: 428,906

[30] Foreign Application Priority Data
Dec. 26, 1972 Japan............................. 47-129507

[52] U.S. Cl............. 200/61.25, 200/83 L, 335/205, 340/58
[51] Int. Cl.. H01h 35/24, H01h 36/00, B60c 23/06
[58] Field of Search...... 200/61.22, 61.25, 61.45 M, 200/81.9 M, 82 E, 80 B, 83 L; 340/58; 116/34 R; 335/205

[56] References Cited
UNITED STATES PATENTS

| | | |
|---|---|---|
| 1,683,343 | 9/1928 | Gartner.................... 200/61.25 X |
| 2,629,086 | 2/1953 | Ainsworth et al. ................... 340/58 |
| 3,521,230 | 7/1970 | Poole....................... 200/61.25 X |
| 3,611,220 | 10/1971 | Hoffman ........................... 200/82 E |
| 3,638,180 | 1/1972 | Lejeune ............................. 340/58 |
| 3,654,601 | 4/1972 | Munson et al. ............... 200/61.25 X |
| 3,781,787 | 12/1973 | Sugiyama.................. 200/61.25 X |

Primary Examiner—James R. Scott
Attorney, Agent, or Firm—Waters, Roditi, Schwartz & Nissen

[57] ABSTRACT

An alarm device capable of detecting reduction in vehicular tire air pressure below a critical level irrespective of the vehicle speed, notwithstanding that the critical pressure level is variable with the vehicle speed. It includes detector means, a signalling circuit including a magnetic switch, a magnet secured to a casing of the detector means, and a spring-biased, air-pressure responsive magnetic short circuiting member which is preferably in a floating state in the casing free from friction, for accurate detection of the variation in the air pressure within the tire.

2 Claims, 2 Drawing Figures

PATENTED MAR 25 1975 3,873,787

AIR-PRESSURE SWITCH DEVICE FOR PNEUMATIC TIRES

BACKGROUND OF THE INVENTION

This invention relates generally to air-pressure alarm devices for pneumatic tires which are adapted to detect a failure in the level of tire air pressure and to produce an alarm signal therefor.

Previously known are devices of the kind described which are designed to detect any reduction in tire air pressure below a predetermined, critical level and which operate an appropiate signalling device provided at the driver's seat for the purpose of preventing bursting and other tire accidents that may occur with excessive reduction in tire air pressure.

On the other hand, the level at which the air pressure in pneumatic tires should be held rises substantially in proportion with the speed at which the vehicle travels and, in cases where a vehicle runs continuously at speeds higher than usual, the air pressure actually present in the tires may sometimes be exceeded by the critical pressure level rising with the vehicle speed, even if the actual air pressure level held in the tires be appropiate for usual vehicle speeds. Under this situation, previous forms of alarm devices have been unsatisfactory, being incapable of detecting such shortage of tire air pressure occurring at vehicle speeds higher than usual.

SUMMARY OF THE INVENTION

In view of the above, the present invention has for its object the provision of a new and improved air pressure alarm device for pneumatic tires which is free from the above-described deficiency of previous devices, and is operable to produce an appropriate alarm signal whenever the tire air pressure becomes short of the critical level for the speed at which the vehicle travels, irrespective of whether the speed is usual or higher.

Another object of the present invention is to provide an alarm device of the character described which utilizes a highly sensitive pressure-responsive member operable free from friction or other factors restraining the movement thereof for detection of variate in tire air pressure with a maximum of accuracy.

These and other objects of the present invention are attained by providing an alarm device which comprises a signalling circuit including a magnetically operable switch and pressure detector means including a fixed magnet and a pressure-responsive magnetic short-circuiting member normally biased under air pressure in a direction toward the magnet and movable in the opposite direction under the centrifugal force due to rotation of the associated wheel to allow the magnet to close the switch in the signalling circuit.

A preferred embodiment of the present invention will be described with reference to the accompanying drawing.

DESCRIPTION OF THE PREFERRED EMBODIMENT

Figure 1:
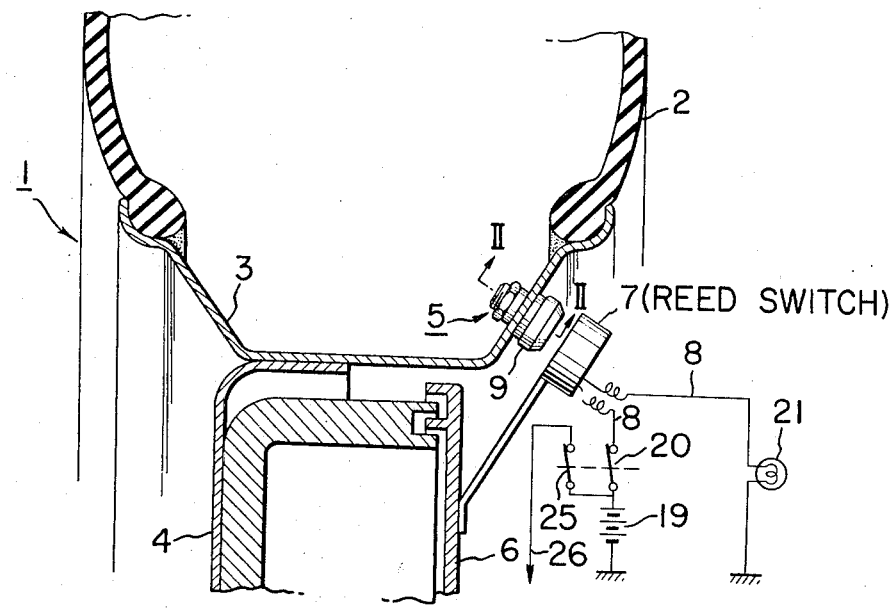
FIG. 1 is a fragmentary, partly schematic, axial cross section of a vehicle wheel equipped with a preferred embodiment of the alarm device of the present invention.

Referring to the drawings and first to FIG. 1, reference numeral 1 generally indicates a vehicle wheel 1 is comprised of a pneumatic tire 2, a rim 3 and a disc 4 fixed thereto. Secured to the rim 3 is a pressure detector 5 forming an essential part of the alarm device of the invention. A magnetically operable electric switch 7 is supported on a stationary member fixed to the body of the vehicle, for example, a brake anchor plate 6, in a position opposite to the pressure detector 5 and, as shown, the switch 7 is connected in an alarm signalling circuit 8. The switch 7 is preferably a conventional reed switch.

Figure 2:
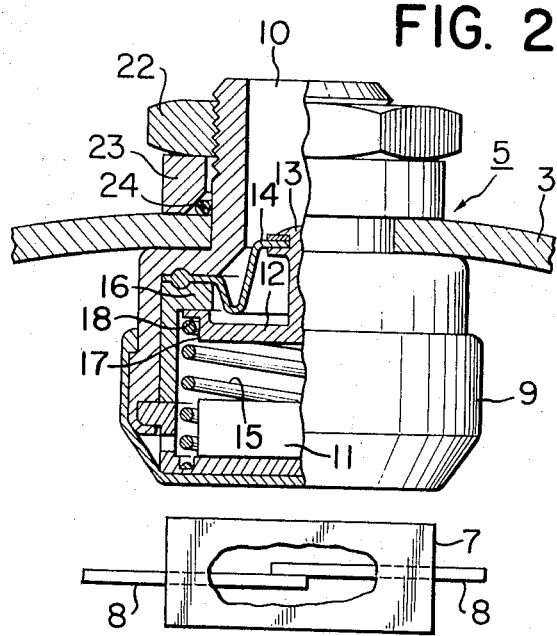
FIG. 2 is an enlarged side view of a pressure detector of the device, partly in a cross section taken along the line II—II in FIG. 1, showing a magnetic switch in an operable state.

Description will next be made of the construction of the pressure detector 5, principally with a reference to FIG. 2, showing a detector casing 9 secured to the wheel rim 3 and presenting its one end to the interior of the pneumatic tire 2 for fluid communication therewith through an opening 10 formed in the casing end.

Accommodated in the casing 9 are a magnet 11 fixedly secured to the bottom thereof and a magnetic short-circuiting member 12 arranged afloat for movement toward and away from the magnet 11 under the effect of the centrifugal force occurring with the rotation of the wheel 1. In a conventional manner, the magnet 11 exerts its force on the reed switch 7 when brought into proximity, thereby closing an electric circuit to be described hereafter. The magnetic member 12 is generally disc-shaped and formed with an integral axial projection 13, and a pressure-responsive displacement member such as a diaphragm 14 is secured in the casing 9 transversely thereof and anchored at its center to the tip of the axial projection 13. The diaphragm 14 is thus placed opposite to the end opening 10 of the casing 9, which is in fluid communication with the interior of the pneumatic tire 2, and is axially displaceable by the air pressure in the tire.

A coiled compression spring 15 is also accommodated in the casing 9 between the magnetic member 12 and the casing bottom, to which the magnet 11 is secured, to bias the magnetic member 12 upwardly, as viewed in FIG. 2, against the air pressure acting thereon through the intermediary of the diaphragm 14. An annular flanged stop 16 is secured to the inner wall of the casing 9 to limit upward movement of the magnetic memmber 12.

As shown, the member 12 is formed around the periphery thereof with an annular shoulder defining a cylindrical surface 17 of limited axial length for fitting engagement with the top of compression spring 15 and an annular spring seat 18 on which the compression spring 15 is supported at the top end thereof. With this arrangement, the compression spring 15 serves to support the magnetic short-circuiting member 12 on the underside thereof and to guide it in the axial movement.

Referring again to FIG. 1, there the an electric power source 19, a main operating switch 20 and an alarm lamp 21 connected in the signalling circuit 8. The switch 20 is so associated with an ignition switch 25 of the vehicle that both are simultaneously closed. The closed position of switch 20 is related to the motor running position of the ignition switch (details of the vehicular electric circuit are only partly shown at 26).

As can be seen in FIG. 2, the pressure detector unit 5 is passed through an appropriate opening of the rim 3 and is secured thereat by means of a conventional nut 22, by the interposition of a collar 23 and a selaing ring 24. For the sake of clarity, some of the reference numerals shown in FIG. 2 have been omitted from the partly schematic illustration of FIG. 1.

The operation of the alarm device described above is as follows:

First, in cases where the pneumatic pressure in tire 2 is at the normal level for usual vehicle speeds, the magnetic member 12 is kept in contact with the magnet 11 under the attraction thereof, as long as the vehicle is in the usual state of running, as the air pressure acting directly upon the diaphragm 14 causes axial movement of the magnetic member 12 and the diaphragm 14 toward the magnet 11 against the bias of compression spring 15 to such an extent as to enable the magnet 11 to attract the member 12.

In other words, the magnet 11 is held magnetically short-circuited by the member 12 and in contact therewith, exhibiting only a reduced magnetic field strength which is insufficient to operate the magnetic switch 7 connected in the signalling circuit 8. Thus the switch remains in its normal, open position so that the alarm lamp 21 remains off as long as the vehicle is running at usual speeds.

If, however, the air pressure in tire 2 is reduced below the standard level, for example, by air leakage resulting from the treading over a nail or the like of the tire, the reduction in the pneumatic pressure allows the compression spring 15 to extend, overcoming the attraction of the magnet 11 acting on the member 12. In this manner, the latter is moved away from the magnet 11 against the now reduced pneumatic pressure to abut against the annular stop 16, as shown in FIG. 2.

Accordingly, the force of the magnet 11 acting upon the magnetically operable switch 7 is increased to close it, thereby to complete the signalling circuit 8 so that the alarm lamp 21 is energized.

The alarm device is not only operable to produce an alarm signal whenever, during the vehicle travel at usual speed, the tire air pressure is reduced below the critical level for some cause or other but is capable of detecting any shortage of tire air pressure such as occurs when the vehicle, with its tires filled with air to an appropriate pressure level for running at the usual speed, runs continuously at such higher speed that the critical level of tire air pressure exceeds the actual tire air pressure of the vehicle.

If the vehicle runs continuously at such higher speed that the centrifugal force acting on the magnetic member 12 exceeds the sum of the magnetic attraction of magnet 11 and the pneumatic force acting on the member 12 through the diaphragm 14, the member 12 is moved away from the latter, allowing the magnet 11 with its increased magnetic force to close the magnetic switch 7, and the signalling circuit 8 thus completed to light the alarm lamp 19.

Since the magnetic member 12, secured to the diaphragm 14 for axial movement with variation in the air pressure in tire 2, is supported and guided by the coiled compression spring 15, making no sliding contact with any of the surrounding parts including the inner peripheral wall of the detector casing 9, it is to be noted that the member 12 is not only axially movable substantially free from any frictional drag but has a substantial freedom of lateral movement. This means that the magnetic member 12 is floatingly movable in any direction in accordance with the pneumatic thrust acting on the diaphragm 14 and thus is highly responsive to variation in tire air pressure, enabling accurate detection thereof in terms of the magnitude of displacement.

In summary, there is provided according to the present invention an improved air-pressure alarm device for pneumatic tires which markedly contributes to driving safety, and having advantageous characteristics as follows:

First, the signalling circuit 8 is not only completed to produce an alarm signal in the event that the air pressure in the tire 2 is reduced below the critical level during travel of the vehicle at usual speed, but also in the event that the critical value of the pneumatic pressure, rising with the travelling speed of the vehicle, rises to exceed the normal pressure level maintained in the pneumatic tire. In other words, the alarm device is at all times capable of detecting a reduction in tire air pressure below the critical level thereof to produce an appropriate alarm signal, irrespective of the speed at which the vehicle travels, and thus ensures driving safety notwithstanding the fact that the critical level of tire air pressure is variable with the vehicle speed.

Further, the magnetic short-circuiting member 12 accommodated in the detector casing 9 is supported by spring means 15 in a floating state with a substantial freedom of lateral movement and is movable with air-pressure responsive displacement member such as the diaphragm 14 under the guidance of the spring 15 wihout making any sliding contact with the surrounding components, and hence member 12 is substantially free from any frictional drag. The magnetic member 12 is highly responsive to variate in tire air pressure, enabling accurate detection thereof in terms of displacement and signalling without delay.

While one preferred embodiment of the invention has been shown and described, it is to be apparent to those skilled in the art that various changes and modifications may be made therein without departing from the spirit and scope of the invention.

What is claimed is:

1. An air-pressure alarm device for pneumatic tires, comprising pressure detector means (5) secured to a portion (3) of a vehicle wheel (1) for detecting air pressure in the pneumatic tire of the wheel, and an alarm signalling circuit (8) including a magnetically operable switch (7) secured to a stationary component (6) of the vehicle in a position opposite to said detector means, the latter including a casing (9) fixed to the wheel portion, a magnet (11) secured to said casing, spring means (15) arranged in said casing, and a magnetic short-circuiting member (12) accommodated in said casing for movement in a direction toward said magnet under the effect of the air pressure in the tire, and movable in the opposite direction, away from said magnet, under the combined effect of the bias of said spring means and the centrifugal force acting upon said magnetic member upon rotation of the wheel, said magnet being operable to close said switch to complete said signalling circuit upon separation of said magnetic member from said magnet.

2. The alarm device as defined in claim 1, wherein said magnet (11) is in fixed relation to said casing (9), said magnetic member (12) is afloat in said casing in a position opposite to said magnet, said spring means

(15) is arranged to normally bias said magnetic member in a direction away from said magnet, and wherein said detector means (5) further includes an air-pressure responsive displacement member (14) arranged in said casing substantially transversely thereof, for movement in response to variations in the air pressure in the tire, said magnetic member being connected at one end with said displacement member and supported at the other end by said spring means for movement under the guidance thereof.

* * * * *